United States Patent
Vajravel

(10) Patent No.: US 10,263,830 B2
(45) Date of Patent: Apr. 16, 2019

(54) OPTIMIZED DATA TRANSFER FOR REDIRECTED UASP DEVICES

(71) Applicant: Wyse Technology L.L.C., Santa Clara, CA (US)

(72) Inventor: Gokul Thiruchengode Vajravel, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 249 days.

(21) Appl. No.: 15/413,089

(22) Filed: Jan. 23, 2017

(65) Prior Publication Data
US 2018/0213063 A1    Jul. 26, 2018

(51) Int. Cl.
| G06F 15/16 | (2006.01) |
| H04L 12/24 | (2006.01) |
| G06F 9/00 | (2006.01) |
| H04L 29/08 | (2006.01) |

(52) U.S. Cl.
CPC .............. *H04L 41/046* (2013.01); *G06F 9/00* (2013.01); *H04L 67/28* (2013.01)

(58) Field of Classification Search
CPC .......... H04L 41/046; H04L 67/28; G06F 9/00
See application file for complete search history.

*Primary Examiner* — Ryan J Jakovac
(74) *Attorney, Agent, or Firm* — Kirton McConkie; Brian Tucker

(57) ABSTRACT

Data transfer can be optimized for redirected UASP devices. When a UASP device is connected to a client terminal that has established a remote session on a server, the VDI can use a network optimal transfer length in place of the actual MAXIMUM TRANSFER LENGTH and OPTIMAL TRANSFER LENGTH of the UASP device. As a result, the server will use the specified network optimal transfer length for requests sent to the redirected UASP device. These requests can therefore be sent to the client in an optimal manner. Then, to optimize the performance of the UASP device, the requests can be split on the client into multiple requests having the OPTIMAL TRANSFER LENGTH and then submitted to the UASP device. In this way, the VDI can optimize the transfer of requests over the network as well as the servicing of requests by the UASP device.

20 Claims, 14 Drawing Sheets

600

601

In Response To A Device Being Connected To A Client Terminal While The Client Terminal Has Established A Remote Session On A Server, Obtain, By A Proxy Executing On The Client Terminal, Device Information From The Device, The Device Information Including A First Value For OPTIMAL TRANSFER LENGTH And A First Value For MAXIMUM TRANSFER LENGTH

602

Cause A Virtual Disk Enumerator Executing On The Server To Provide The Device Information To An Operating System Of The Server To Thereby Redirect The Device To The Server, Wherein The Device Information Provided To The Server Includes A Second Value For OPTIMAL TRANSFER LENGTH And A Second Value For MAXIMUM TRANSFER LENGTH, The Second Value Representing A Network Optimal Transfer Length

603

Receive, At The Proxy, A First Request Targeting The Device, The First Request Having A Transfer Length Equal To The Network Optimal Transfer Length

603

Split The First Request Into A Plurality Of Second Requests That Each Have A Transfer Length Equal To The First Value For OPTIMAL TRANSFER LENGTH

*FIG. 6*

OPTIMIZED DATA TRANSFER FOR REDIRECTED UASP DEVICES

CROSS-REFERENCE TO RELATED APPLICATIONS

N/A

BACKGROUND

The present invention is generally directed to the redirection of USB Attached SCSI Protocol (UASP) devices in a virtual desktop infrastructure (VDI) environment. Device redirection generally refers to making a device that is connected to a client terminal accessible within a virtual desktop as if the device had been physically connected to the virtual desktop. In other words, when device redirection is implemented, a user can connect a device to his or her client terminal and the device will function as if it had been connected to the server.

FIGS. 1 and 2 and the following description will provide a general overview of how device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client terminal 102 can remotely access applications and data at the server 104 from the client terminal 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client terminal 102 may initiate a remote session with server 104 by sending a request for remote access and credentials (e.g., login name and password) to server 104. If server 104 accepts the credentials from client terminal 102, then server 104 may establish a remote session, which allows a user at client terminal 102 to access applications and data at server 104. During the remote session, server 104 sends display data to client terminal 102 over network 106, which may include display data of a desktop and/or one or more applications running on server 104. The desktop may include, for example, icons corresponding to different applications that can be launched on server 104. The display data allows client terminal 102 to locally display the desktop and/or applications running on server 104.

During the remote session, client terminal 102 may send user commands (e.g., inputted via a mouse or keyboard at client terminal 102) to server 104 over network 106. Server 104 may process the user commands from client terminal 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client terminal 102. Client terminal 102 locally displays the updated display data so that the user at client terminal 102 can view changes at server 104 in response to the user commands. Together, these aspects allow the user at client terminal 102 to locally view and input commands to the desktop and/or application that is running remotely on server 104. From the perspective of the client side, the desktop running on server 104 may represent a virtual desktop environment.

Windows I/O uses a layered architecture where device drivers are on a device stack. In a basic model, the top of the stack is the file system. Next is the volume manager, followed by the disk driver. At the bottom of the device stack are the port and miniport drivers. When an I/O request reaches the file system, it takes the block number of the file and translates it to an offset in the volume. The volume manager then translates the volume offset to a block number on the disk and passes the request to the disk driver. When the request reaches the disk driver it will create a Command Descriptor Block (CDB) that will be sent to the SCSI device. The disk driver imbeds the CDB into a structure called the $SCSI_{13}$ REQUEST_BLOCK (SRB). This SRB is sent to the port driver as part of the I/O request packet (IRP).

The port driver does most of the request processing including providing timing services for requests, enforcing queue depth (making sure that a device does not get more requests that it can handle), and building scatter gather arrays for data buffers. The port driver interfaces with a driver called the miniport. The miniport driver is designed by the hardware manufacturer to work with a specific adapter and is responsible for taking requests from the port driver and sending them to the target logical unit number (LUN). The port driver calls the HwStorStartIo( ) function to send requests to the miniport, and the miniport will send the requests to the LUN. When the request is complete, the miniport will call StorPortNotification( ) with the NotificationType parameter value set to RequestComplete, along with a pointer to the completed SRB.

FIG. 2 is a block diagram of a virtual desktop infrastructure (VDI) environment 200 which can implement this type of functionality when a mass storage device is redirected from a client terminal 102 to a server 104 over a remote session. As shown, while client terminal 102 has established a remote session with server 104, a mass storage device 240 is connected to client terminal 102. In accordance with embodiments of the present invention, client terminal 102 can be configured to redirect device 240 over the remote session so that the device is accessible on server 104. Proxy 210 on client terminal 102 and agent 250 on server 104 can be configured to establish and maintain the remote session to enable this redirection.

FIG. 2 provides a general overview of the primary components that can be employed to redirect mass storage device 240 at the disk level. This technique can be referred to as disk level redirection and is distinguished from general USB redirection in that the redirection occurs at the disk level rather than at the USB device level. In particular, client terminal 102 can include a disk driver stack 220 that includes a disk driver 220a, a USB storage driver 220b, and a USB hub driver 220c. As is known in the art, USB storage driver 220b and USB hub driver 220c can implement the USB protocol to enable communication with device 240 as a USB mass storage device. Disk driver 220a, which in some embodiments may be an instance of the disk.sys process, can function to service read/write requests and to abstract the underlying USB storage and hub drivers 220b, 220c.

When mass storage device 240 is connected to client terminal 102, disk driver 220a may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, disk driver 220 redirects device 240 to server 104 via proxy 210.

Agent 250 may be configured to receive the report from proxy 210 that device 240 is connected to client terminal 102 and the device information. Agent 250 may further be configured to associate with the report from proxy 210 one or more identifiers for client terminal 102 and/or for a user session through which client terminal 102 is connected to server 104, such as a session number or a session locally unique identifier (LUID). Agent 250 can provide notification of device 240, along with the device information, to virtual disk enumerator 260. Virtual disk enumerator 260 may be configured to create and store in memory a record corresponding to device 240, the record including at least part of the device information and session identifiers received from agent 250. Virtual disk enumerator 260 may be configured to report to operating system 170 of server 104 that device 240 is connected and to provide the device information to the operating system. This allows the operating system of server 1204 to recognize the presence of device 240 even though device 240 is connected to client terminal 102.

Based on the device information, operating system 170 may load a corresponding disk driver 282, which may be another instance of the disk.sys process, which may sit below a file system stack 280 to receive and convert file system requests to disk requests (e.g., by creating a CDB and embedding it in an SRB) and to pass these disk requests (e.g., IRPs and associated SRBs) to virtual disk enumerator 260 at the bottom of the device stack. It is noted that a volume manager is not shown in this figure for simplicity. Virtual disk enumerator 260 functions to virtualize mass storage device 240 on server 104 (as represented by virtual mass storage device 290). This virtualization is accomplished by routing the disk requests to agent 250 which will forward them over the remote session to proxy 210, down through disk driver stack 220, and to mass storage device 240 where they can be fulfilled. Corresponding responses can then be routed in a reverse direction towards virtual disk enumerator 260 and up through disk driver 282, file system stack 280, operating system 170, and ultimately to an application 270 that originated the request.

It is to be understood that an IRP itself is not transferred between proxy 210 and agent 250 (since much of the IRP is server-specific (e.g., pointers) and would therefore be meaningless on the client). Instead, sufficient content of the IRP is transferred from agent 250 to proxy 210 to allow proxy 210 to recreate (or to cause to be recreated) an equivalent IRP on the client side. A similar process is employed when proxy 210 returns results of handling an IRP.

When UASP devices are connected to a computer, they can advertise various parameters that can be used by the computer when transferring data to the devices. For example, a UASP device can maintain a MAXIMUM TRANSFER LENGTH parameter which specifies the maximum transfer length in blocks that the device accepts for a single command as well as an OPTIMAL TRANSFER LENGTH parameter which specifies the optimal transfer length in blocks for a single command. Transfers that exceed this optimal transfer length may incur significant delays in processing due to the architecture of the device. Accordingly, the operating system may query a UASP device for such parameters in order to optimize commands it may send.

In a redirection scenario, however, adherence to these parameters may actually hinder performance. For example, although the OPTIMAL TRANSFER LENGTH may be optimal for the UASP device, it may not be optimal for transfer over a network. Therefore, employing the OPTIMAL TRANSFER LENGTH for a redirected UASP device may result in large network overhead. For example, if 64 KB of data needs to be written and the OPTIMAL TRANSFER LENGTH is 4 KB, the operating system on the server may generate 16 different writes of 4 KB each. Each of these 4 KB writes would then be individually transferred over the network to the client with each transfer incurring overhead (e.g., compression, deduplication, etc.). The end result is that the write of the full 64 KB will take much longer. To avoid this additional network overhead, the operating system could be configured to employ the MAXIMUM TRANSFER LENGTH rather than the OPTIMAL TRANSFER LENGTH. Although doing so will reduce the network overhead, it will not be optimal for the UASP device. In addition to the delays that may result while the UASP device handles the less than optimal transfer length, using the MAXIMUM TRANSFER LENGTH will likely cause the UASP device to fail sooner than if the OPTIMAL TRANSFER LENGTH were employed. For these reasons, when a UASP device is redirected, many of the benefits that the UASP provides are lost.

BRIEF SUMMARY

The present invention extends to methods, systems, and computer program products for optimizing data transfer for redirected UASP devices. When a UASP device is connected to a client terminal that has established a remote session on a server, the VDI can use a network optimal transfer length in place of the actual MAXIMUM TRANSFER LENGTH and OPTIMAL TRANSFER LENGTH of the UASP device. As a result, the server will use the specified network optimal transfer length for requests sent to the redirected UASP device. These requests can therefore be sent to the client in an optimal manner. Then, to optimize the performance of the UASP device, the requests can be split on the client into multiple requests having the OPTIMAL TRANSFER LENGTH and then submitted to the UASP device. In this way, the VDI can optimize the transfer of requests over the network as well as the servicing of requests by the UASP device.

In one embodiment, the present invention is implemented in a virtual desktop infrastructure environment as a method for optimizing data transfer for a redirected device. In response to a device being connected to a client terminal while the client terminal has established a remote session on a server, a proxy executing on the client terminal can obtain device information from the device. The device information includes a first value for OPTIMAL TRANSFER LENGTH and a first value for MAXIMUM TRANSFER LENGTH. The proxy can cause a virtual disk enumerator executing on the server to provide the device information to an operating system of the server to thereby redirect the device to the server. The device information provided to the server includes a second value for OPTIMAL TRANSFER LENGTH and a second value for MAXIMUM TRANSFER LENGTH where the second value represents a network optimal transfer length. The proxy then receives a first request targeting the device. The first request has a transfer length equal to the network optimal transfer length. The proxy splits the first request into a plurality of second requests that each have a transfer length equal to the first value for OPTIMAL TRANSFER LENGTH.

In another embodiment, the present invention is implemented as computer storage media storing computer executable instructions which when executed implement a virtual desktop infrastructure environment comprising: a proxy that is configured to execute on a client terminal; an agent that is configured to execute on a server and to establish a remote display protocol connection with the proxy; and a virtual disk enumerator that is configured to execute on the server. In response to a device being connected to the client terminal, the proxy is configured to obtain device information from the device. The device information includes a first value for OPTIMAL TRANSFER LENGTH. The proxy is also configured to transfer the device information to the virtual disk enumerator via the agent. The virtual disk enumerator is configured to report modified device information to an operating system of the server. The modified device information includes a second value for OPTIMAL TRANSFER LENGTH and the second value for MAXIMUM TRANSFER LENGTH.

In another embodiment, the present invention is a method for optimizing data transfer for a redirected UASP device. A proxy that executes on a client terminal queries device information from a UASP device when the UASP device is connected to the client terminal. The proxy sends the device information to a virtual disk enumerator that executes on a server via an agent that also executes on a server. The virtual disk enumerator provides modified device information to an operating system of the server. The modified device information includes a different value for OPTIMAL TRANSFER LENGTH and for MAXIMUM TRANSFER LENGTH than specified by the device thereby causing the server to use a transfer length equal to the different value for requests targeting the device. In response to receiving a first request having a transfer length equal to the different value, the proxy generates a plurality of requests that each have a transfer length equal to a value for OPTIMAL TRANSFER LENGTH as specified by the device. The proxy then submits the plurality of requests to the device rather than the first request.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 6 provides a flowchart of an example method for optimizing data transfer for a redirected device.

DETAILED DESCRIPTION

The present invention can be implemented as part of a virtual desktop infrastructure (VDI) environment to optimize data transfer for redirected UASP devices. A remote session can be established using any remote display protocol including, for example, Microsoft's Remote Desktop Protocol (RDP), Citrix's Independent Computing Architecture (ICA), VMWare's PC-over-IP (PCoIP), Dell's vWorkspace (EOP), etc.

Figure 1:
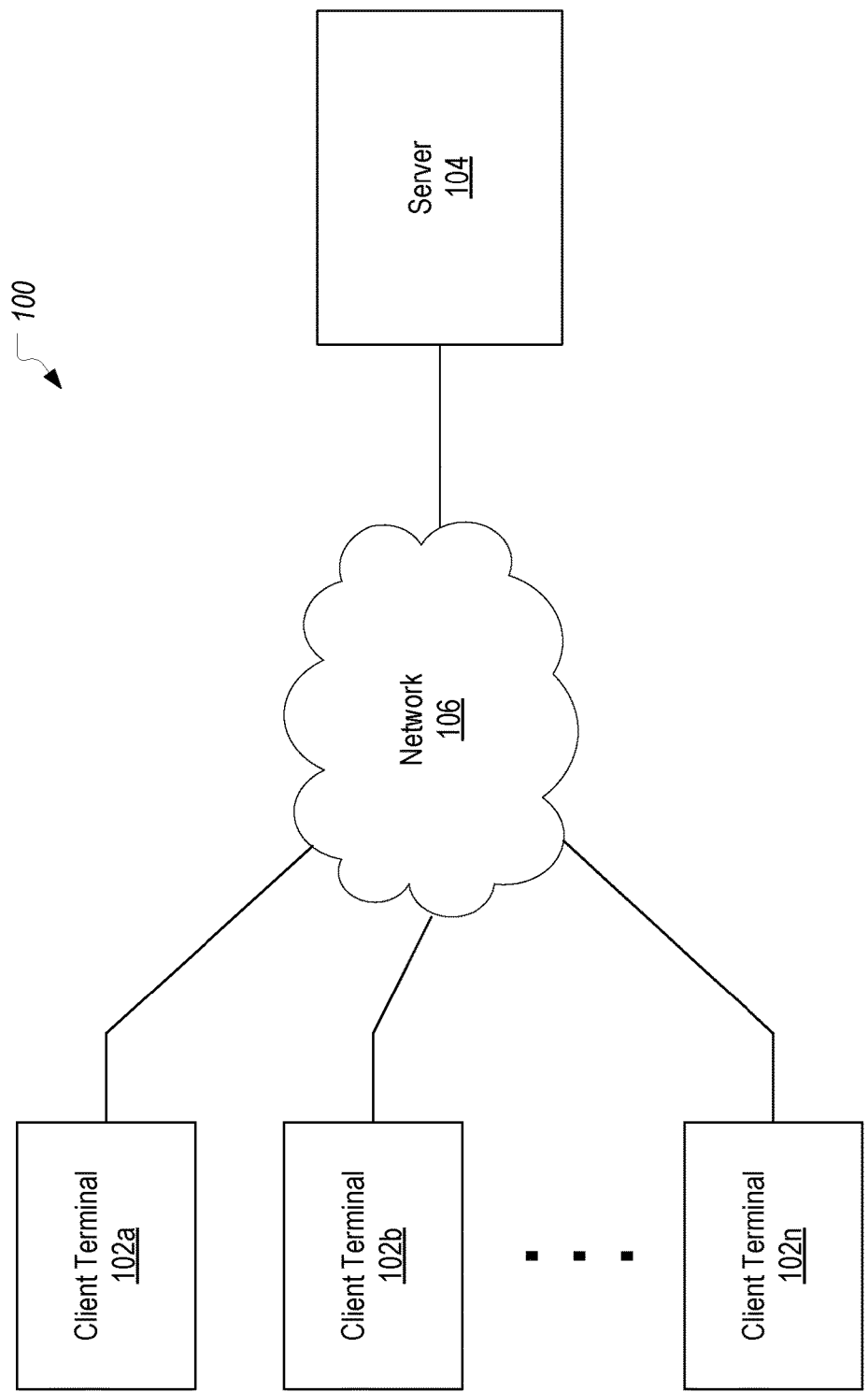
FIG. 1 illustrates an example computing environment in which the present invention can be implemented.
Figure 2:
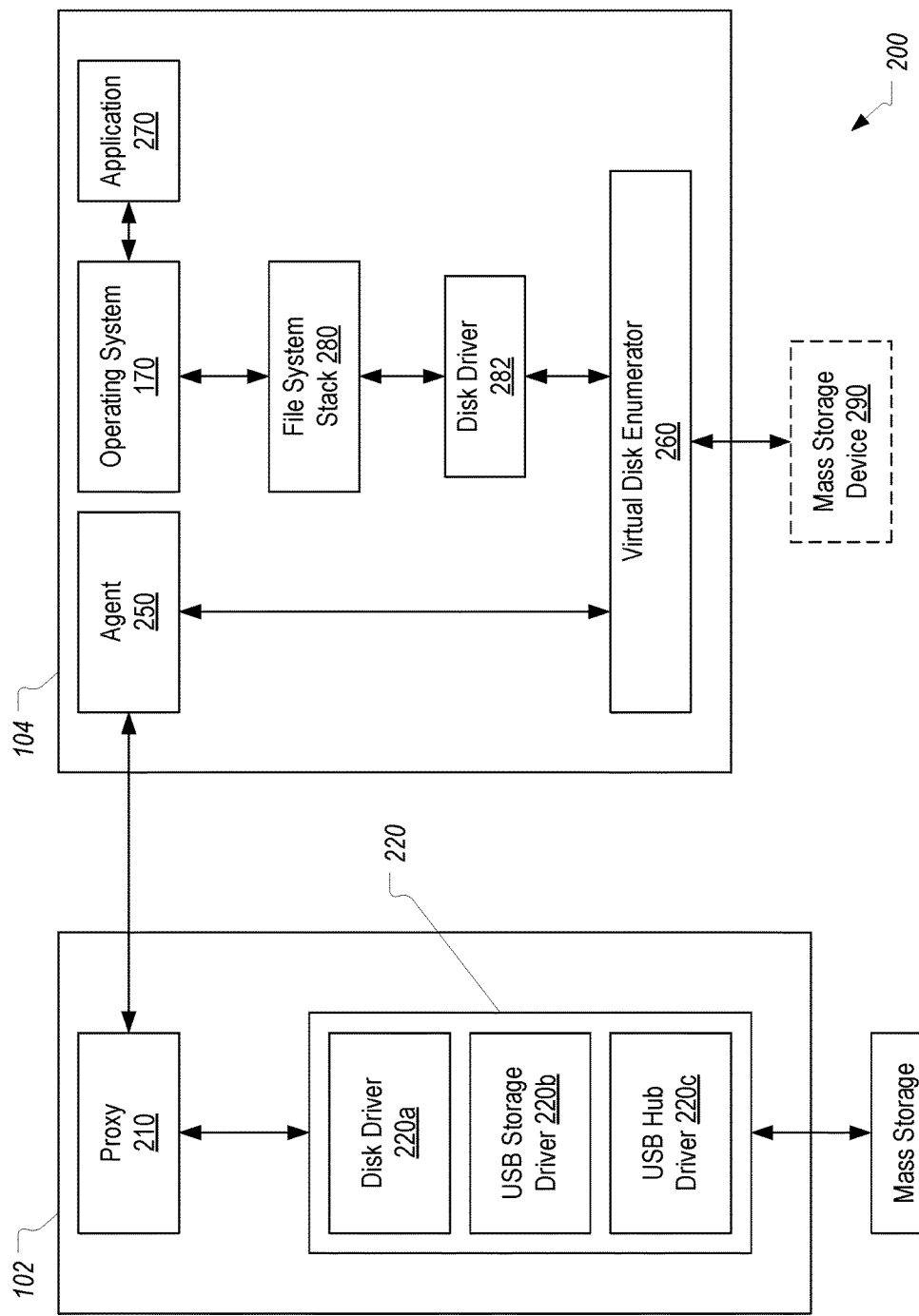
FIG. 2 illustrates how a mass storage device connected to a client can be redirected over a remote session to the server.
Figure 3:
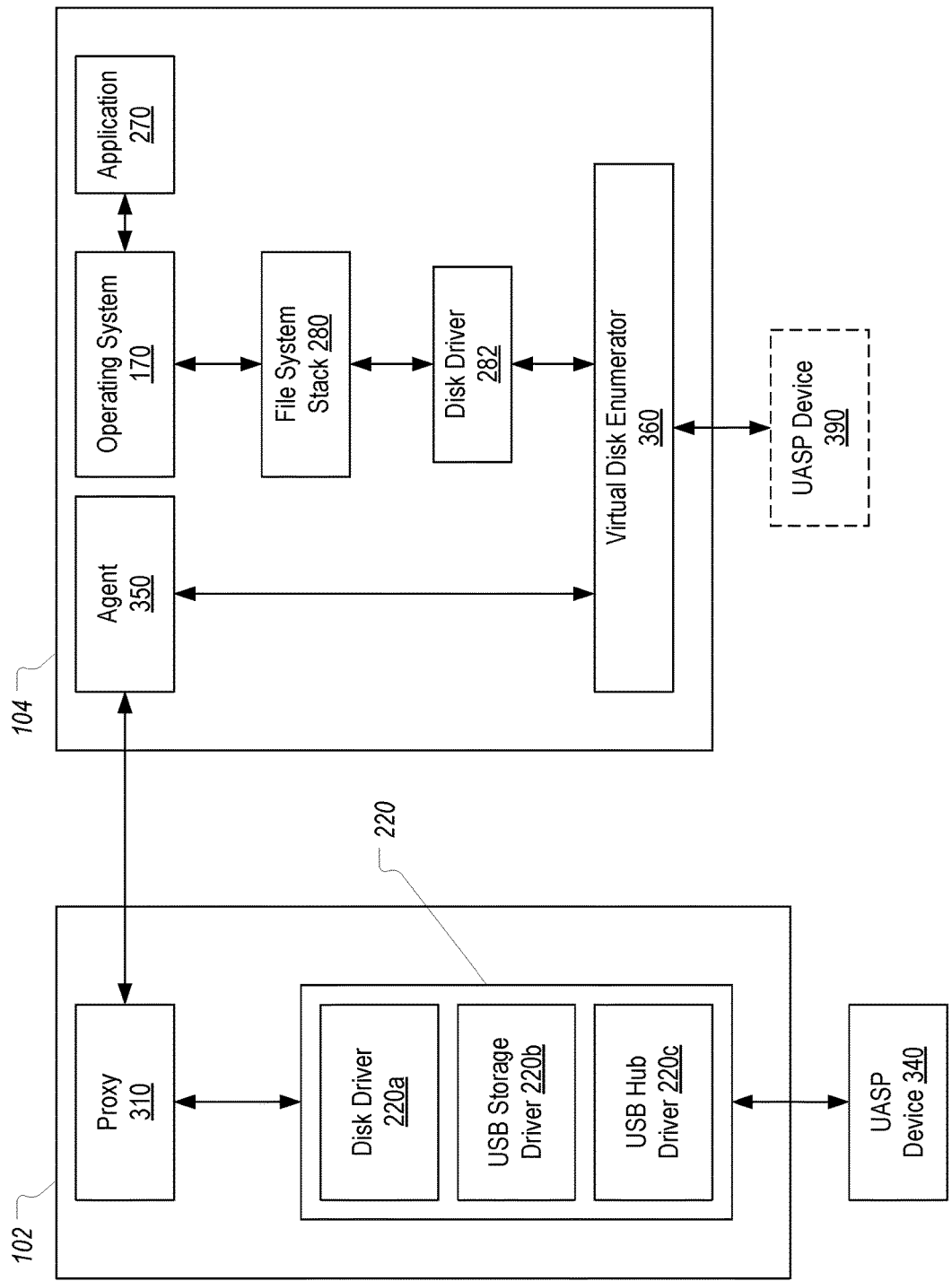
FIG. 3 illustrates a VDI environment in which the present invention can be implemented.

FIG. 3 illustrates an example redirection environment in which the present invention can be implemented. FIG. 3 is similar to FIG. 2 and is intended to represent that the redirection of UASP device 340 to server 104 can be carried out in much the same manner as described in the background (i.e., at the disk level). However, proxy 310, agent 350, and/or virtual disk enumerator 360 can be configured to implement the various techniques of the present invention to cause requests targeting UASP device 340 to be optimized. The combination of proxy 310, agent 350, and virtual disk enumerator 360 will be referred to collectively herein as the virtual desktop infrastructure or VDI. The general reference to VDI is intended to emphasize that some of the functions of the present invention could be performed by proxy 310, agent 350, or virtual disk enumerator 360. Therefore, when a function is described as being performed by the VDI, it should be understood that one or more of proxy 310, agent 350, or virtual disk enumerator 360 may be performing the function.

Figure 4A:
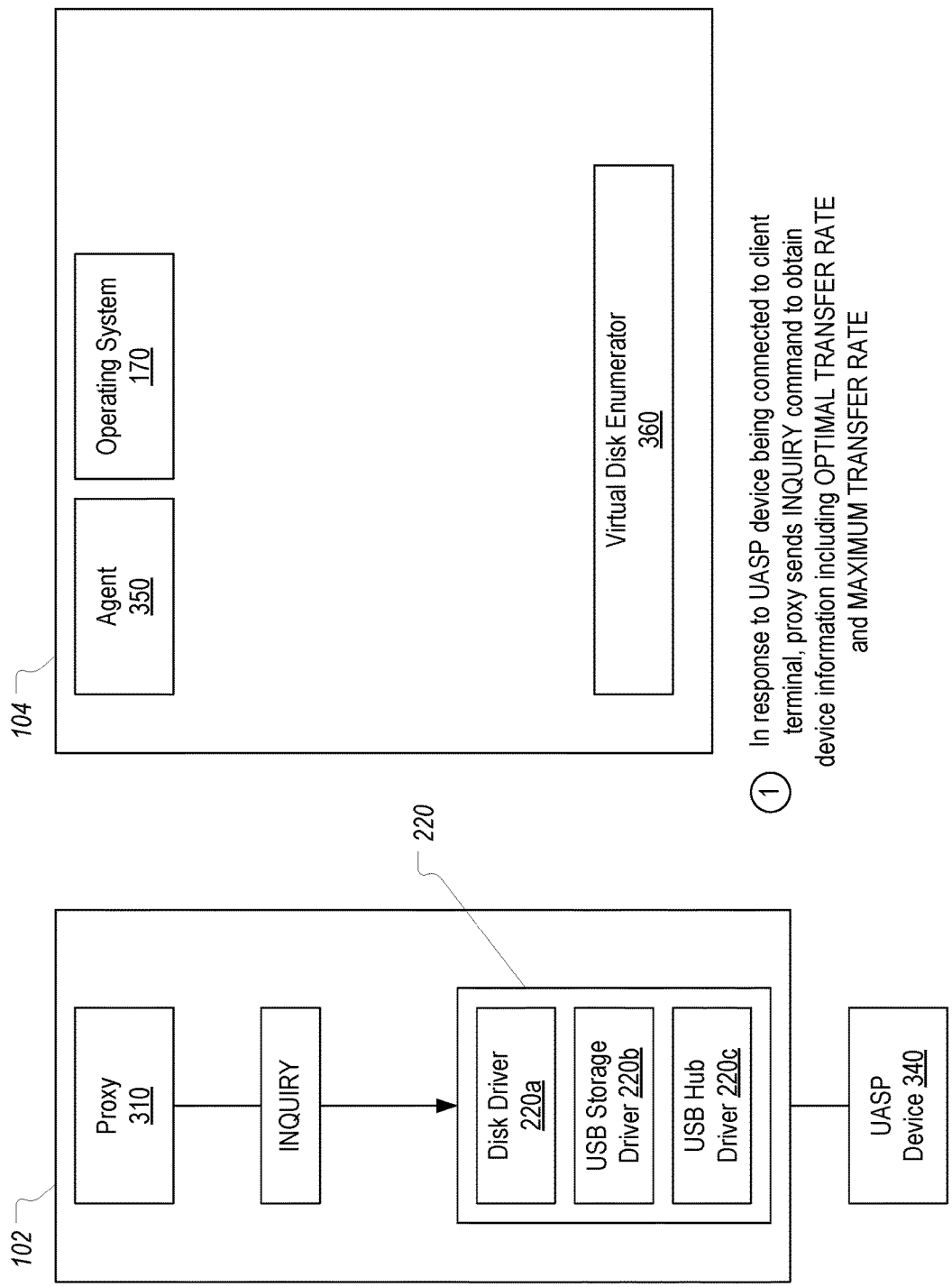
FIG. 4A-4E illustrate how a VDI can enable requests targeting a redirected UASP device to be optimized.

FIGS. 4A-4E illustrate a sequence of steps that can be performed by the VDI to enable requests targeting UASP device 340 to be optimized. In FIG. 4A, it is assumed that proxy 310 and agent 350 have established a remote display protocol connection and that UASP device 340 has been connected to client terminal 102. As a result, disk driver stack 220 will have been loaded on client terminal 102. In step 1, proxy 310 can send one or more INQUIRY commands to UASP device to request information about UASP device 340, including, most importantly, the OPTIMAL TRANSFER LENGTH for UASP device 340 (which may typically be obtained by specifying page code B0 in the INQUIRY command).

Figure 4B:
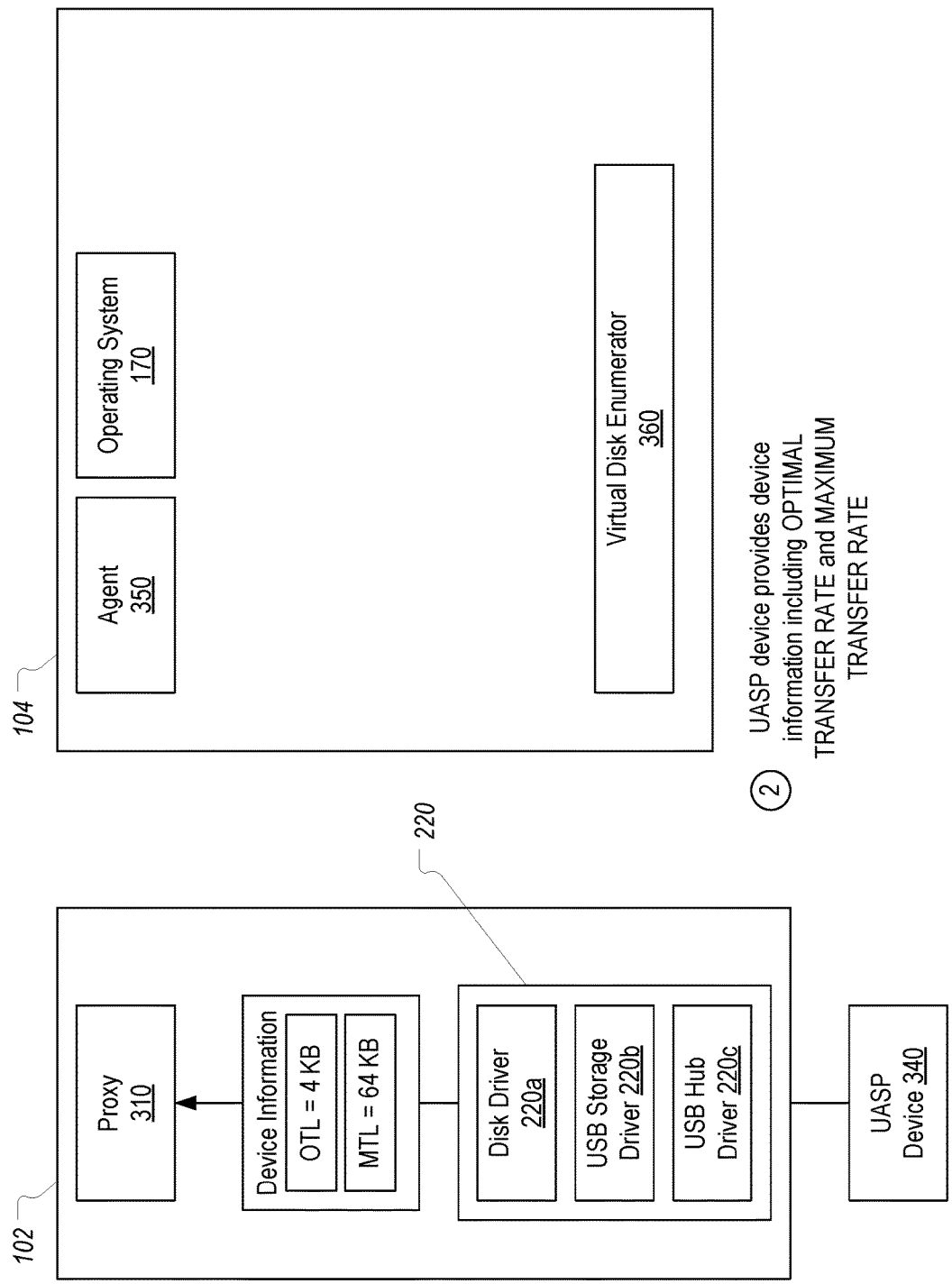

In response to the INQUIRY command(s), UASP device 340 will return its device information including its OPTIMAL TRANSFER LENGTH and MAXIMUM TRANSFER LENGTH as represented as step 2 in FIG. 4B. In this example, it will be assumed that the OPTIMAL TRANSFER LENGTH and MAXIMUM TRANSFER LENGTH reported by UASP device 340 are 4 KB and 64 KB respectively. For reasons that will be explained below with reference to FIGS. 5A-5E, proxy 310 will store the OPTIMAL TRANSFER LENGTH (and possibly the MAXIMUM TRANSFER LENGTH) reported by UASP device 340.

Figure 4C:
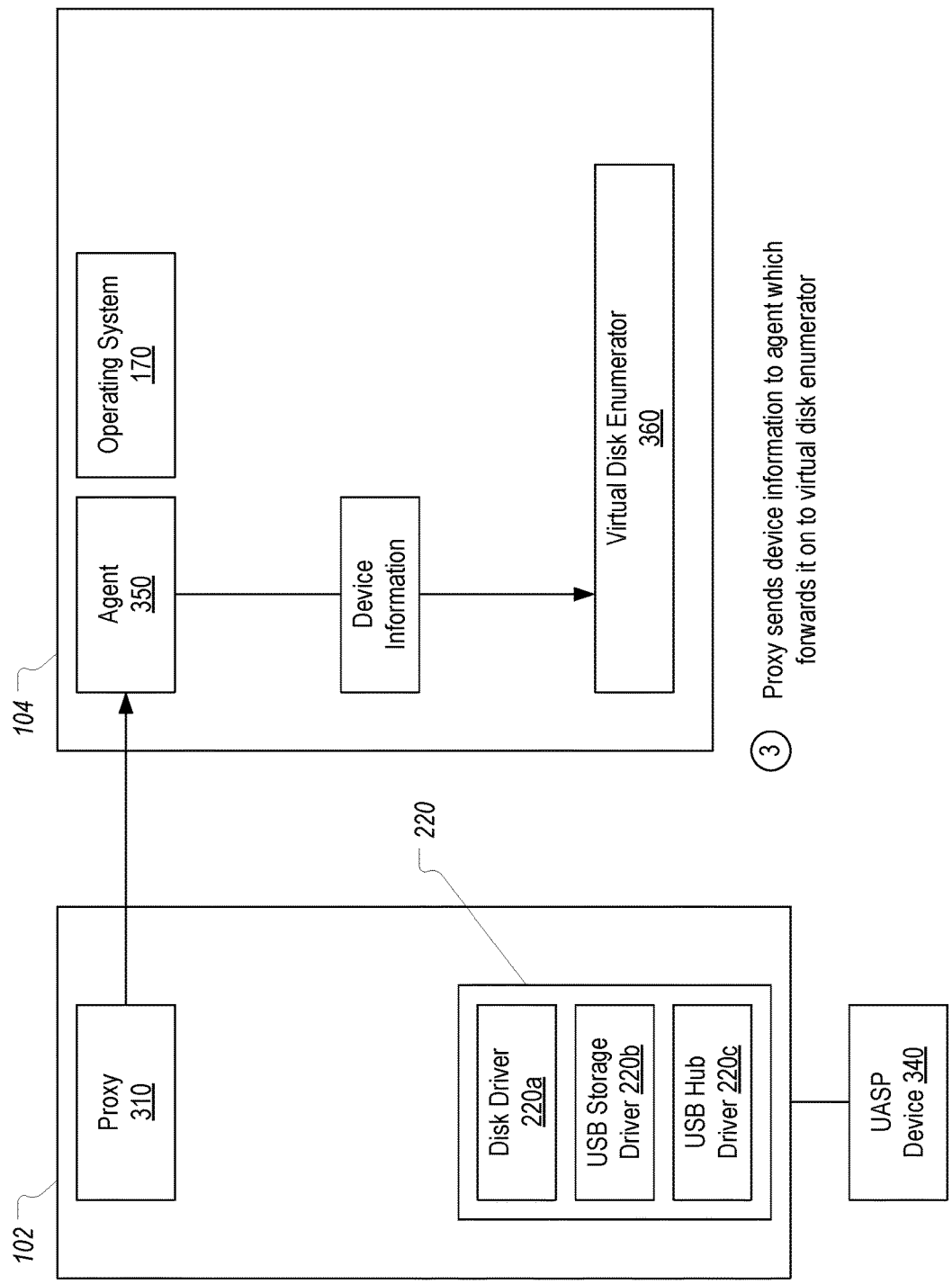
Figure 4D:
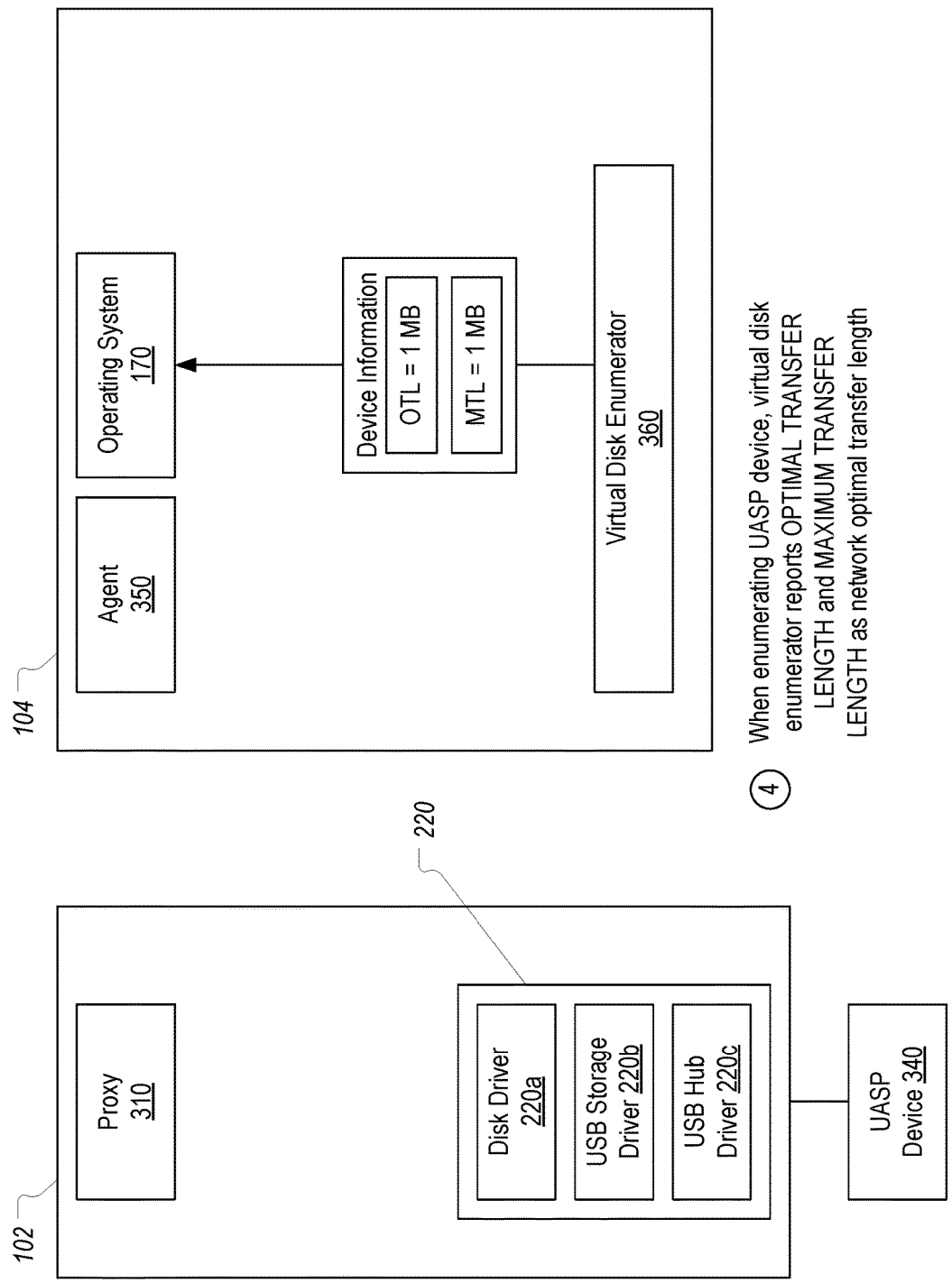
Figure 4E:
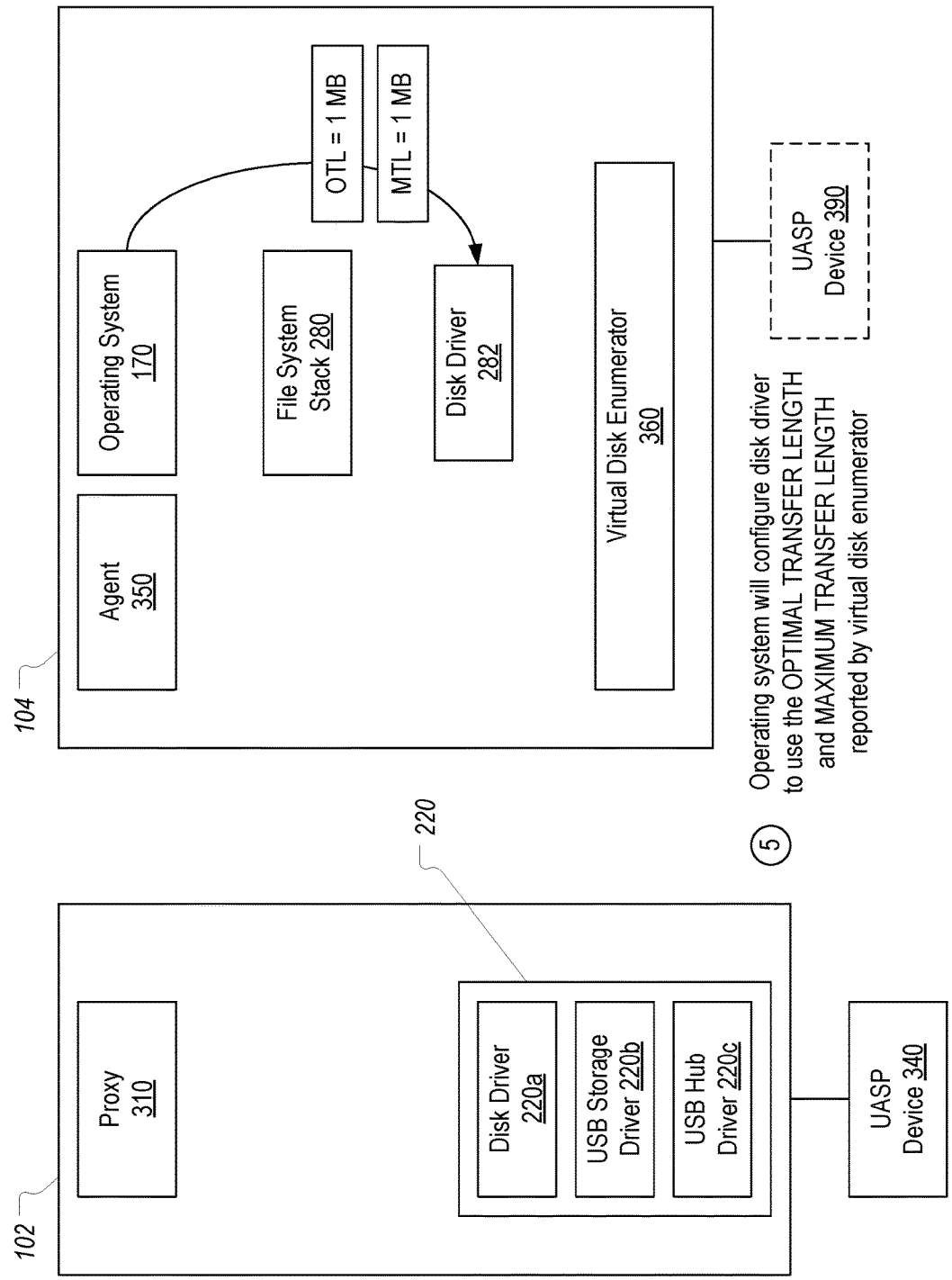

Then, in step 3 as represented in FIG. 4C, proxy 310 can route this device information to virtual disk enumerator 360 via agent 350. Although not shown, this device information may include values for the OPTIMAL TRANSFER LENGTH and MAXIMUM TRANSFER LENGTH.

Once virtual disk enumerator 360 has received the device information (which serves as notice that UASP device 340 has been connected to client terminal 102 and should be redirected to server 104), virtual disk enumerator 360 can enumerate UASP device 340 to the plug and play component of operating system 170. Of primary importance to the present invention, in the device information provided to operating system 170, the values for the OPTIMAL TRANSFER LENGTH and MAXIMUM TRANSFER LENGTH parameters will be set to a network optimal transfer length. In the depicted example, it is assumed that this network optimal transfer length is 1 MB. Accordingly, the actual values of the OPTIMAL TRANSFER LENGTH and MAXIMUM TRANSFER LENGTH will be replaced with the network optimal transfer length when UASP device 340 is enumerated on server 104.

As a result, when operating system 170 loads the stack for UASP device 340/390, it will configure disk driver 282 to employ the reported values for OPTIMAL TRANSFER LENGTH and MAXIMUM TRANSFER LENGTH when sending requests to UASP device 340/390. In essence, disk driver 282 will be tricked into using a transfer length that is optimal for the network connection between client terminal 102 and server 104 rather than using the actual OPTIMAL TRANSFER LENGTH or MAXIMUM TRANSFER LENGTH for UASP device 340.

In FIGS. 4A-4E, the manner in which the network optimal transfer length is determined and specified is not shown due to the number of different ways in which this can be accomplished. For example, in some embodiments, proxy 310, agent 350, or virtual disk enumerator 360 could be configured to replace the values for OPTIMAL TRANSFER LENGTH and MAXIMUM TRANSFER LENGTH in the device information with a preconfigured network optimal transfer length. In other embodiments, proxy 310 and/or agent 350 could be configured to dynamically determine the network optimal transfer length for any given remote display protocol connection and then update the OPTIMAL TRANSFER LENGTH and MAXIMUM TRANSFER LENGTH (or cause virtual disk enumerator 360 to update the OPTIMAL TRANSFER LENGTH and MAXIMUM TRANSFER LENGTH) accordingly. In any case, the VDI can be configured to cause a network optimal transfer length to be reported to operating system 170 in place of the actual values of the OPTIMAL TRANSFER LENGTH and MAXIMUM TRANSFER LENGTH parameters.

As mentioned above, due to the processing described in FIGS. 4A-4E, disk driver 282 should format requests (e.g., read and write requests) targeting UASP device 340 with a transfer length matching the network optimal transfer length. However, if such requests were submitted to UASP device 340, it would not perform optimally. To address this issue, proxy 310 can be configured to perform additional processing on a request to allow for optimal performance of UASP device 340.

FIGS. 5A-5E illustrate how proxy 310 can handle a request that has a transfer length that has been set based on the network optimal transfer length rather than the actual OPTIMAL TRANSFER LENGTH for UASP device 340. In step 1 shown in FIG. 5A, disk driver 282 is shown as generating a SCSI request 500 with a transfer length that matches the OPTIMAL TRANSFER LENGTH (and the MAXIMUM TRANSFER LENGTH) that virtual disk enumerator 360 reported for UASP device 340. To be consistent with FIGS. 4A-4E, it will be assumed in FIG. 5A that the reported OPTIMAL TRANSFER LENGTH (and the reported MAXIMUM TRANSFER LENGTH) was 1 MB. As described in the background, disk driver 282 can submit request 500 to virtual disk enumerator 360.

Figure 5A:
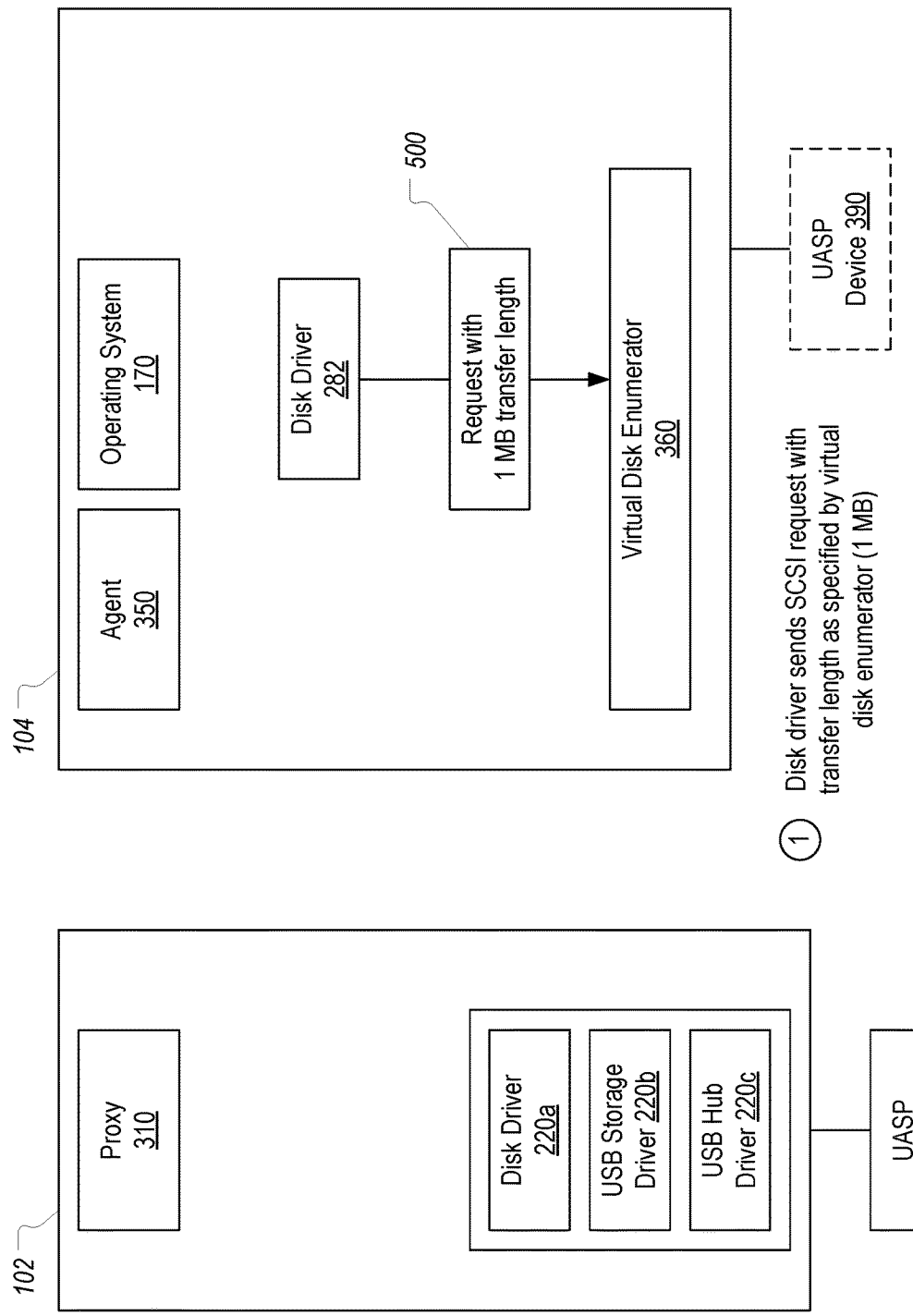
FIGS. 5A-5E illustrate how the VDI can cause requests to be transferred over the network with a network optimal transfer length and then provided to the UASP device with the optimal transfer length for the UASP device.
Figure 5B:
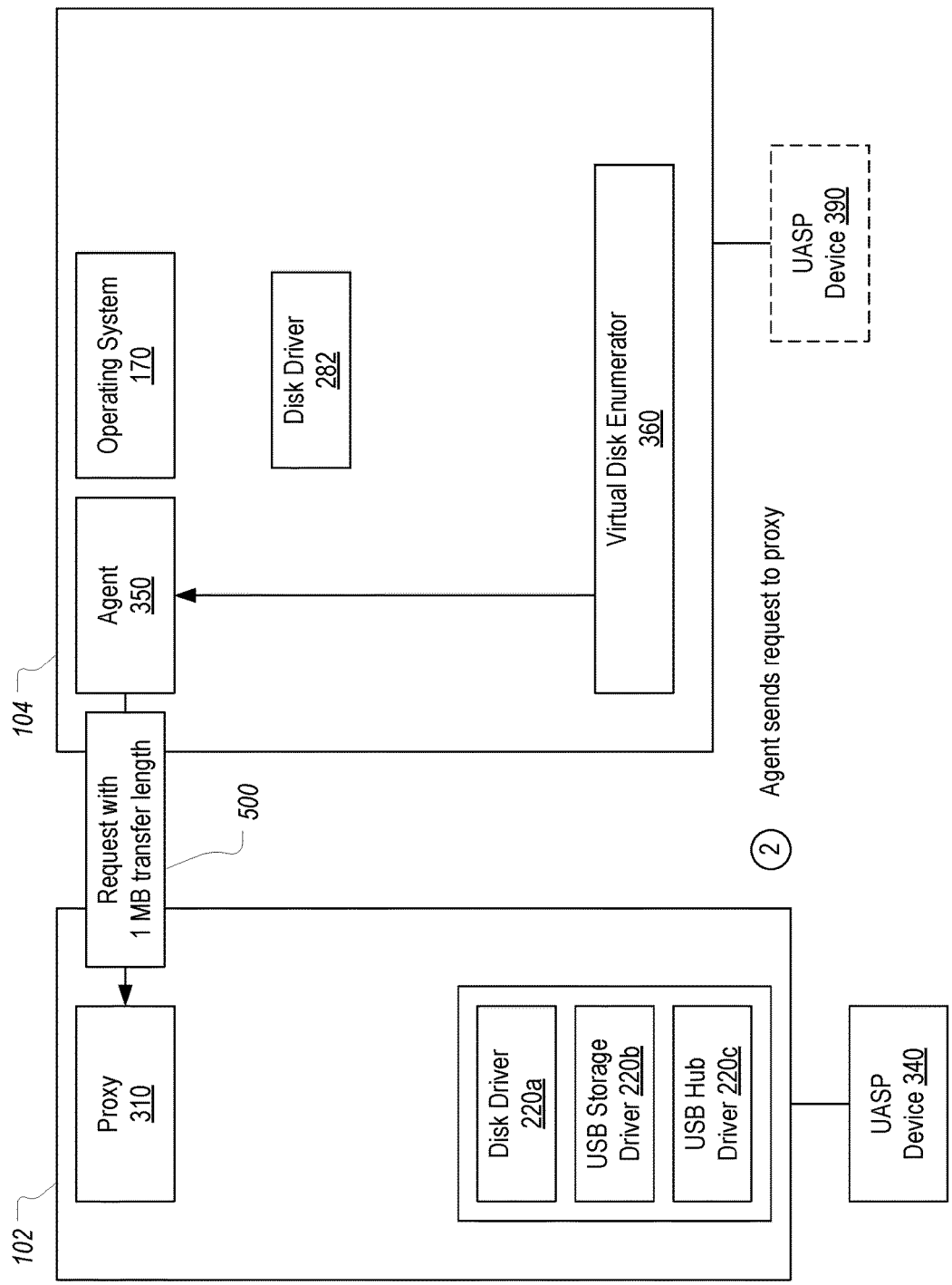
Figure 5C:
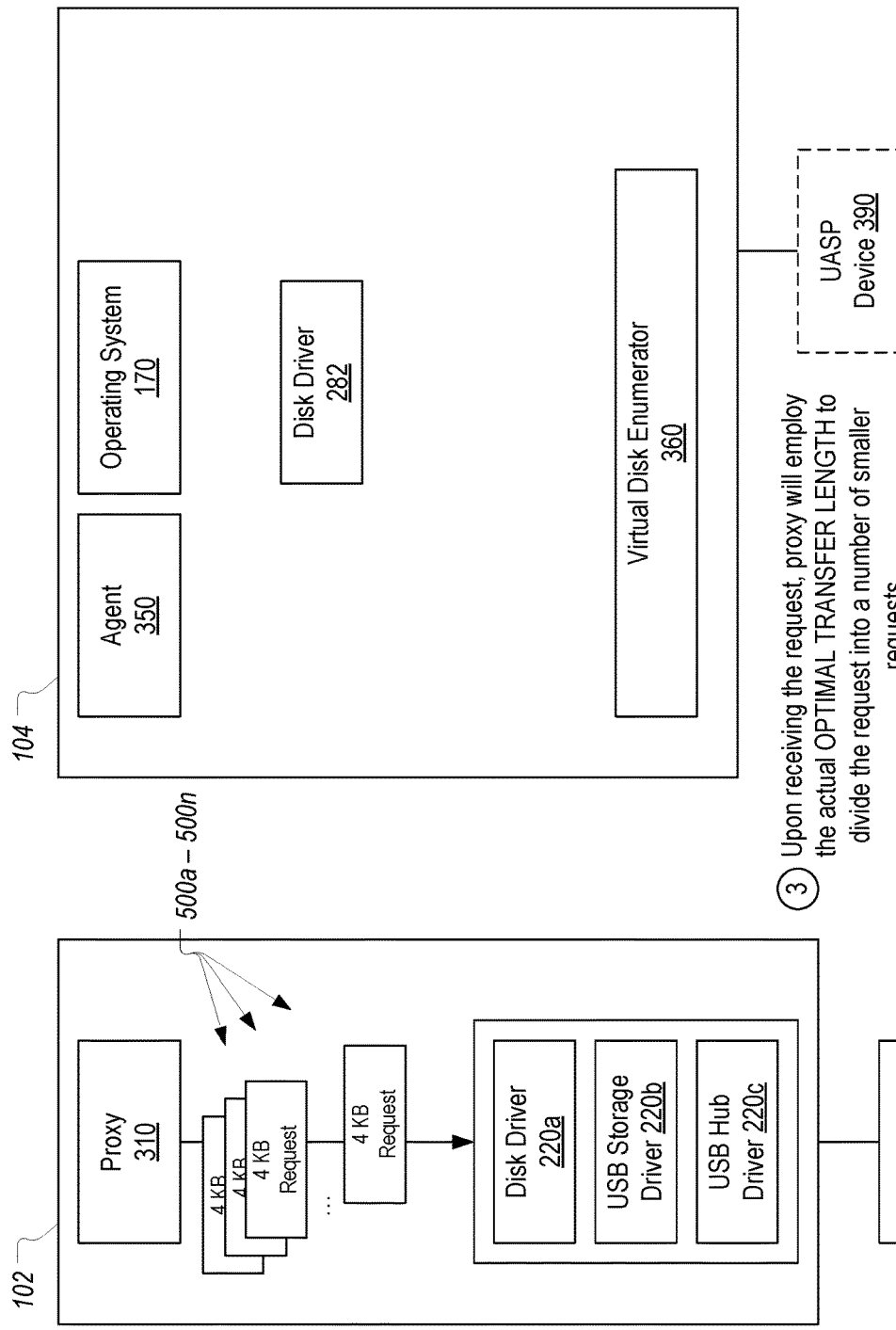

FIG. 5B shows that, in step 2, virtual disk enumerator 360 can route request 500 to agent 350 (after performing the appropriate processing), and then agent 350 can send request 500 over the network to proxy 310. Based on the assumption that a 1 MB transfer is optimal for the network, request 500 can be transferred more efficiently than a number of smaller requests performing the same function (e.g., a single write request with a transfer length of 1 MB can be transferred over the network more efficiently than 250 write requests with a transfer length of 4 KB). It is noted that if request 500 is a write request, it will include data to write and will therefore have a size in excess of 1 MB and would therefore be transferred more efficiently, whereas, if request 500 is a read request, it will not include data and will therefore not actually have a size in excess of 1 MB and may not therefore be transferred more efficiently. However, in the case of a read, the network optimization will occur on the back end when the data is returned as will be further described below. In any case, whether request 500 is a read request or a write request, it will still specify a transfer length which is assumed to be 1 MB (e.g., the TRANSFER LENGTH field in the command descriptor block of request 500 will specify a number of logical blocks equal to 1 MB).

Upon receiving request 500, proxy 310 can access the actual OPTIMAL TRANSFER LENGTH for UASP device 340 which it had previously stored. Proxy 310 can then determine that request 500 has a transfer length that is greater than the OPTIMAL TRANSFER LENGTH. In response and as shown in step 3 in FIG. 5C, proxy 310 can split request 500 into a number of requests 500a-500n that each have a transfer length equal to the OPTIMAL TRANSFER LENGTH. In this example, the OPTIMAL TRANSFER LENGTH is assumed to be 4 KB and therefore request 500 can be split into 250 requests each having a transfer length of 4 KB (e.g., 250 requests that each have a command descriptor block with its TRANSFER LENGTH field set to a number of logical blocks equal to 4 KB). For example, requests 500a-500n could each comprise a request to write 4 KB of data to UASP device 340, or requests 500a-500n could each comprise a request to read 4 KB of data from UASP device 340. Of course, if the transfer length of request 500 happened to not be evenly divisible by the OPTIMAL TRANSFER LENGTH, at least one of requests 500a-500n may not have a transfer length equal to the OPTIMAL TRANSFER LENGTH.

Figure 5D:
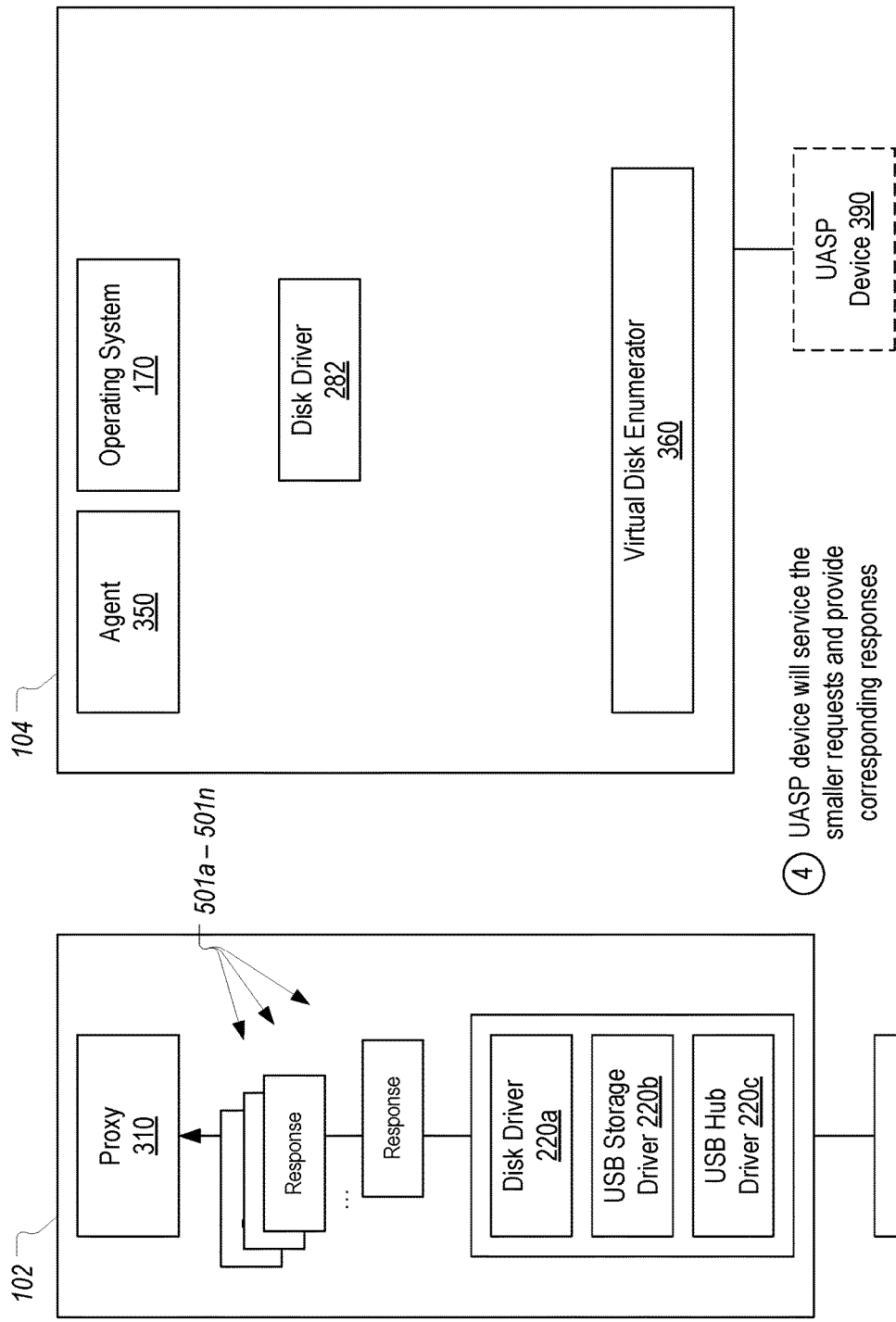

Proxy 310 can then submit each of requests 500a-500n to UASP device 340 for handling. Because requests 500a-500n have a transfer length equal to the OPTIMAL TRANSFER LENGTH, UASP device 340 can handle the requests optimally. As shown in FIG. 5D as step 4, UASP device 340 will generate appropriate responses 501a-501n to requests 500a-500n and provide responses 501a-501n back to proxy 310. For example, if requests 500a-500n had been read requests, responses 501a-501n could each include 4 KB of data. In contrast, if requests 500a-500n had been write requests, responses 501a-501n could each include confirmation that 4 KB of data had been written.

Figure 5E:
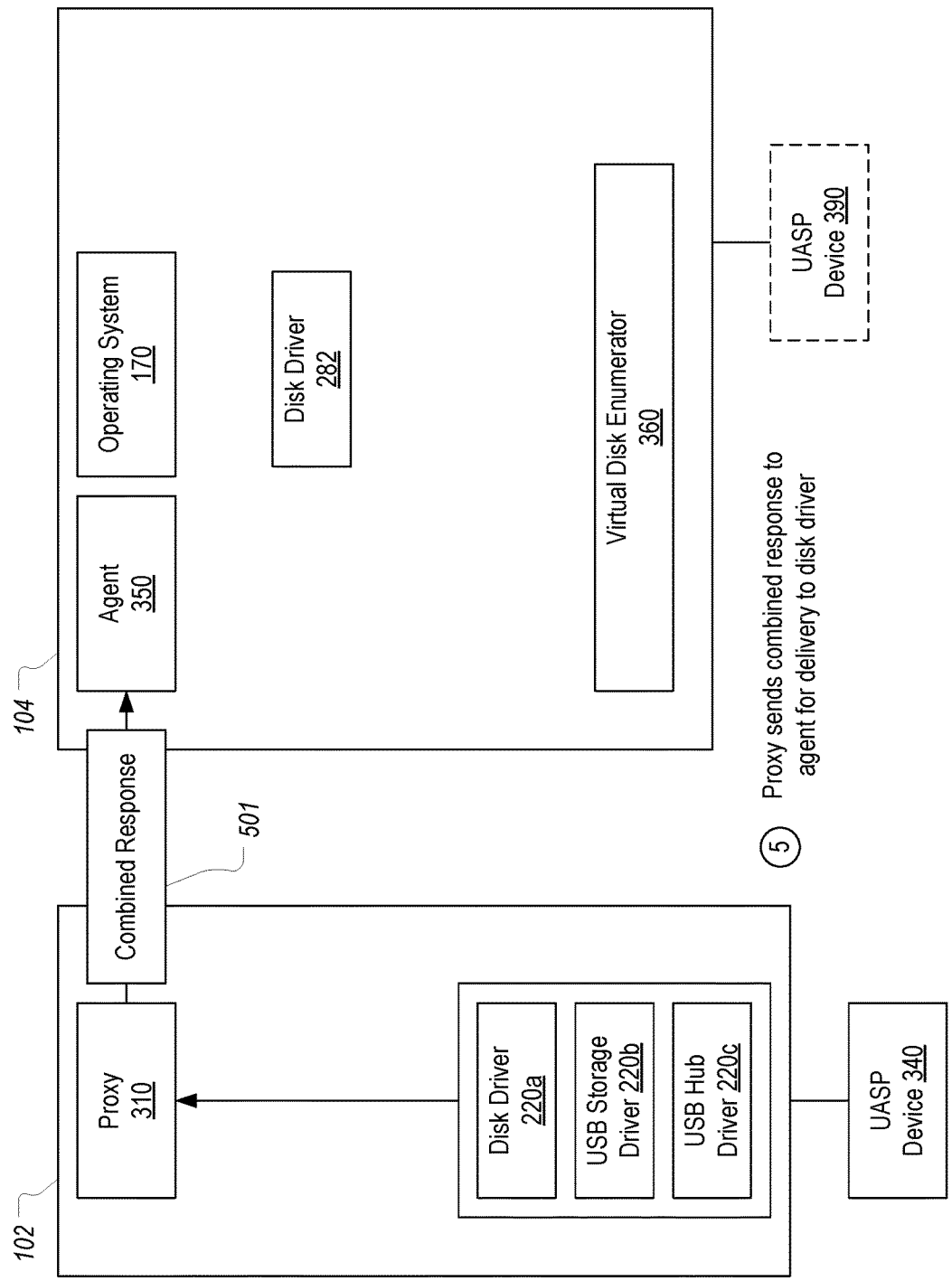

Finally, in step 5 as shown in FIG. 5E, proxy 310 can combine responses 501a-501n into a single response 501 having a transfer length corresponding to the transfer length of request 500 (which in this case would be 1 MB) and then send response 501 to agent 350 for delivery to disk driver 282. As mentioned above, if request 500 had been a read request, responses 501a-501n would have each included 4 KB of data read from UASP device 340 and therefore response 501 would include the combined 1 MB of data. Since 1 MB is the network optimal transfer length, the read data will be transferred more efficiently in the single response 501 than if the 250 responses 501a-501n had been individually transferred. Accordingly, in the case of a read request, the network optimization occurs primarily on the back end when the data is transferred to server 104.

Although not shown in the figures, if any of requests 500a-500n fails, proxy 310 can be configured to fail request 500. For example, if request 500 is a read request and one or more of requests 500a-500n fails, proxy 310 can discard the data that was retrieved by the successful requests and instead configure response 501 to indicate failure of request 500. Similarly, if request 500 is a write request and one or more of requests 500a-500n fails, proxy 310 can configure response 501 to indicate failure of request 500. In the case of a failed write request 500, proxy 310 can take appropriate action to undo any of the write requests 500a-500n that completed successfully thereby ensuring that the state of UASP device 340 remains consistent.

As can be seen, the fact that proxy 310 splits a single request into multiple requests is hidden from disk driver 282. The present invention can therefore be implemented without modifying operating system 170 or disk driver 282. As long as the VDI is configured to report the network optimal transfer length to operating system 170 in place of the OPTIMAL TRANSFER LENGTH and MAXIMUM TRANSFER LENGTH, no further modifications are required on server 104. The present invention can therefore be seamlessly implemented in a number of existing server environments. Similarly, proxy 310 can perform its client-side processing in a manner that is substantially transparent to the remaining client-side components.

FIG. 6 provides a flowchart of an example method 600 for optimizing data transfer for a redirected device. Method 600 can be performed by a proxy of a virtual desktop infrastructure such as proxy 310.

Method 600 includes an act 601 of, in response to a device being connected to a client terminal while the client terminal has established a remote session on a server, obtaining, by a proxy executing on the client terminal, device information from the device, the device information including a first value for OPTIMAL TRANSFER LENGTH and a first value for MAXIMUM TRANSFER LENGTH. For example, proxy 310 can use one or more INQUIRY commands to obtain device information from UASP device 340.

Method 600 includes an act 602 of causing a virtual disk enumerator executing on the server to provide the device information to an operating system of the server to thereby redirect the device to the server, wherein the device information provided to the server includes a second value for OPTIMAL TRANSFER LENGTH and a second value for MAXIMUM TRANSFER LENGTH, the second value representing a network optimal transfer length. For example, proxy 310 can send the device information to virtual disk enumerator 360 via agent 350. Either proxy 310, agent 350, or virtual disk enumerator 360 could modify the values of the OPTIMAL TRANSFER LENGTH and MAXIMUM TRANSFER LENGTH to be equal to a preconfigured or dynamically determined network optimal transfer length.

Method 600 includes an act 603 of receiving, at the proxy, a first request targeting the device, the first request having a transfer length equal to the network optimal transfer length. For example, proxy 310 can receive request 500 which has a transfer length equal to a network optimal transfer length.

Method 600 includes an act 604 of splitting the first request into a plurality of second requests that each have a transfer length equal to the first value for OPTIMAL TRANSFER LENGTH. For example, proxy 310 can generate requests 500a-500n from the content of request 500 which each (or at least most) of requests 500a-500n having a transfer length equal to the OPTIMAL TRANSFER LENGTH of UASP device 340.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented in a virtual desktop infrastructure environment, for optimizing data transfer for a redirected device, the method comprising:
   in response to a device being connected to a client terminal while the client terminal has established a remote session on a server, obtaining, by a proxy executing on the client terminal, device information from the device, the device information including a first value for OPTIMAL TRANSFER LENGTH and a first value for MAXIMUM TRANSFER LENGTH;

causing a virtual disk enumerator executing on the server to provide modified device information to an operating system of the server to thereby redirect the device to the server, wherein the modified device information provided to the server includes a second value for OPTIMAL TRANSFER LENGTH and a second value for MAXIMUM TRANSFER LENGTH, the second value representing a network optimal transfer length;

receiving, at the proxy, a first request targeting the device, the first request having a transfer length equal to the network optimal transfer length; and splitting the first request into a plurality of second requests that each have a transfer length equal to the first value for OPTIMAL TRANSFER LENGTH.

2. The method of claim 1, wherein obtaining the device information comprises sending an INQUIRY command to the device.

3. The method of claim 1, wherein causing the virtual disk enumerator executing on the server to provide the modified device information to the operating system of the server comprises sending the modified device information to the virtual disk enumerator via an agent that executes on the server.

4. The method of claim 3, wherein one of the proxy, the agent, or the virtual disk enumerator replaces the first value for OPTIMAL TRANSFER LENGTH and the first value for MAXIMUM TRANSFER LENGTH with the second value representing the network optimal transfer length.

5. The method of claim 4, wherein the second value representing the network optimal transfer length is determined dynamically based on a network connection between the proxy and the agent.

6. The method of claim 1, wherein the first request includes a command descriptor block having a TRANSFER LENGTH field storing the second value.

7. The method of claim 6, wherein at least some of the second requests includes a command descriptor block having a TRANSFER LENGTH field storing the first value for OPTIMAL TRANSFER LENGTH.

8. The method of claim 6, wherein each of the second requests includes a command descriptor block having a TRANSFER LENGTH field storing the first value for OPTIMAL TRANSFER LENGTH.

9. The method of claim 1, further comprising:
receiving, at the proxy, a plurality of responses from the device corresponding to the plurality of second requests.

10. The method of claim 9, further comprising:
combining the plurality of responses into a single response; and
sending the single response to the server.

11. The method of claim 10, wherein the single response has a transfer length equal to the network optimal transfer length.

12. The method of claim 9, wherein at least one of the plurality of responses comprises a failure of the corresponding second request, the method further comprising:
generating a single response to the first request indicating that the first request failed; and
sending the single response to the server.

13. The method of claim 1, wherein the first request is a read request or a write request.

14. One or more computer storage media storing computer executable instructions which when executed implement a virtual desktop infrastructure environment comprising:
a proxy that is configured to execute on a client terminal;
an agent that is configured to execute on a server and to establish a remote display protocol connection with the proxy; and
a virtual disk enumerator that is configured to execute on the server;
wherein, in response to a device being connected to the client terminal, the proxy is configured to obtain device information from the device, the device information including a first value for OPTIMAL TRANSFER LENGTH, and to transfer the device information to the virtual disk enumerator via the agent; and
wherein the virtual disk enumerator is configured to report modified device information to an operating system of the server, the modified device information including a second value for OPTIMAL TRANSFER LENGTH and the second value for MAXIMUM TRANSFER LENGTH.

15. The computer storage media of claim 14, wherein the proxy is further configured to:
receive, from the agent, a first request targeting the device, the first request having a transfer length equal to the second value; and
split the first request into a plurality of second requests having a transfer length equal to the first value.

16. The computer storage media of claim 15, wherein the proxy is further configured to:
receive a plurality of responses corresponding to the plurality of second requests;
combine the plurality of responses into a single response; and
send the single response to the agent.

17. The computer storage media of claim 16, wherein the single response indicates failure of the first request when any of the plurality of responses indicates failure of the corresponding second request.

18. The computer storage media of claim 14, wherein the second value represents a transfer length that is optimal for network transfers between the proxy and the agent.

19. The computer storage media of claim 14, wherein one or more of the proxy, the agent, or the virtual disk enumerator is configured to generate the modified device information that includes the second value for OPTIMAL TRANSFER LENGTH and the second value for MAXIMUM TRANSFER LENGTH.

20. A method for optimizing data transfer for a redirected UASP device, the method comprising:
querying, by a proxy that executes on a client terminal, device information from a UASP device when the UASP device is connected to the client terminal;
sending the device information to a virtual disk enumerator that executes on a server via an agent that also executes on a server;
providing, by the virtual disk enumerator, modified device information to an operating system of the server, the modified device information including a different value for OPTIMAL TRANSFER LENGTH and for MAXIMUM TRANSFER LENGTH than specified by the device thereby causing the server to use a transfer length equal to the different value for requests targeting the device;
in response to receiving a first request having a transfer length equal to the different value, generating, by the proxy, a plurality of requests that each have a transfer length equal to a value for OPTIMAL TRANSFER LENGTH as specified by the device; and submitting the plurality of requests to the device rather than the first request.

* * * * *